United States Patent
Murase et al.

(10) Patent No.: US 8,371,277 B2
(45) Date of Patent: Feb. 12, 2013

(54) CONTROL SYSTEM FOR INTERNAL COMBUSTION ENGINE

(75) Inventors: Nao Murase, Susono (JP); Shogo Suda, Susono (JP); Nobuhiko Koga, Susono (JP); Takahiko Fujiwara, Susono (JP); Rentaro Kuroki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 519 days.

(21) Appl. No.: 12/449,740

(22) PCT Filed: Feb. 26, 2008

(86) PCT No.: PCT/JP2008/053720
§ 371 (c)(1),
(2), (4) Date: Aug. 25, 2009

(87) PCT Pub. No.: WO2008/105550
PCT Pub. Date: Sep. 4, 2008

(65) Prior Publication Data
US 2010/0083935 A1    Apr. 8, 2010

(30) Foreign Application Priority Data
Feb. 26, 2007    (JP) .................. 2007 045731

(51) Int. Cl.
F02B 47/08    (2006.01)
F02M 25/07    (2006.01)
F02P 5/00     (2006.01)
F01N 3/00     (2006.01)

(52) U.S. Cl. ................. 123/568.11; 123/406.48; 60/285

(58) Field of Classification Search .......................... None
See application file for complete search history.

(56) References Cited

U.S. PATENT DOCUMENTS

| | | | | |
|---|---|---|---|---|
| 3,745,768 | A * | 7/1973 | Zechnall et al. | 123/676 |
| 5,845,492 | A | 12/1998 | Isobe et al. | |
| 5,887,568 | A * | 3/1999 | Takeyama et al. | 123/306 |
| 5,950,419 | A | 9/1999 | Nishimura et al. | |
| 5,974,792 | A | 11/1999 | Isobe | |
| 6,205,776 | B1 * | 3/2001 | Otsuka | 60/285 |
| 6,334,431 | B1 | 1/2002 | Kanehiro et al. | |
| 7,155,899 | B2 * | 1/2007 | Beer et al. | 60/284 |
| 7,377,273 | B2 * | 5/2008 | Miyashita | 123/672 |
| 2003/0079466 | A1 * | 5/2003 | Surnilla | 60/285 |
| 2003/0172647 | A1 * | 9/2003 | Tanaka | 60/286 |
| 2004/0020190 | A1 | 2/2004 | Yoshida | |
| 2008/0147298 | A1 * | 6/2008 | Suda et al. | 701/103 |

FOREIGN PATENT DOCUMENTS

| | | |
|---|---|---|
| JP | A-8-232645 | 9/1996 |
| JP | A-9-88663 | 3/1997 |
| JP | A-11-257062 | 9/1999 |

(Continued)

Primary Examiner — Stephen K Cronin
Assistant Examiner — Sherman Manley
(74) Attorney, Agent, or Firm — Oliff & Berridge, PLC

(57) ABSTRACT

In the present invention, in a control system for a spark ignition internal combustion engine, when a catalyst is not sufficiently active, the ignition timing is advanced to be earlier than MBT to decrease the quantity of hydrocarbons (HC) discharged from the internal combustion engine, and oxygen is supplied to the exhaust gas upstream of the catalyst to thereby oxidize carbon monoxide (CO) discharged from the internal combustion engine. According to this invention, exhaust emissions emitted before activation of the exhaust gas purification apparatus can be decreased as much as possible, and early activation of the catalyst can be achieved by making use of heat generated by oxidation reaction of carbon monoxide (CO).

10 Claims, 11 Drawing Sheets

FOREIGN PATENT DOCUMENTS

| | | |
|---|---|---|
| JP | A-2000-240547 | 9/2000 |
| JP | A-2003-314420 | 11/2003 |
| JP | A-2004-8908 | 1/2004 |
| JP | A-2004-68624 | 3/2004 |
| JP | A-2004-190549 | 7/2004 |
| JP | A-2006-220020 | 8/2006 |

* cited by examiner

CONTROL SYSTEM FOR INTERNAL COMBUSTION ENGINE

This is a National Phase of International Application No. PCT/JP2008/053720 filed Feb. 26, 2008, which claims the benefit of Japanese Patent Application No. 2007-045731 filed Feb. 26, 2007. The disclosure of the prior applications is hereby incorporated by reference herein in its entirety.

TECHNICAL FIELD

The present invention relates to technology of controlling a spark ignition internal combustion engine.

BACKGROUND ART

Japanese Patent Application Laid-Open No. 2006-220020 discloses a technology in which to warm up a catalyst, ignition timing is retarded and the air-fuel ratio of the air-fuel mixture is changed alternately between lean and rich.

Japanese Patent Application Laid-Open No. 9-88663 discloses a technology in which the temperature of a catalyst is raised by operating one or some of the cylinders of an internal combustion engine at a lean air-fuel ratio and operating the other cylinders at a rich air-fuel ratio. This publication also discloses a technology in which when the temperature of the catalyst is lower than a specific temperature (or a temperature at which oxidation reaction of CO in the catalyst is promoted), execution of the above-described control is disabled.

Japanese Patent Application Laid-Open No. 11-257062 discloses a technology in which to raise the temperature of a catalyst in an exhaust gas purification apparatus for an internal combustion engine having an afterburner provided upstream of the catalyst, the internal combustion engine is operated at a rich air-fuel ratio, and secondary air is supplied to the afterburner.

Japanese Patent Application Laid-Open No. 2000-240547 discloses a technology in which when a spark ignition internal combustion engine is cold-started, ignition timing is advanced to be earlier than MBT, whereby the quantity of heat that cooling water receives is increased.

DISCLOSURE OF THE INVENTION

In the technologies described in the above-mentioned publications, no consideration is given to exhaust emissions emitted before a catalyst becomes active.

An object of the present invention is to provide a technology that enables, in a control system for a spark ignition internal combustion engine, early activation of a catalyst while reducing, as much as possible, exhaust emissions emitted before the catalyst becomes active.

According to the present invention, in order to achieve the above object in a control system for a spark ignition internal combustion engine, the ignition timing is advanced to be earlier than MBT and oxygen is supplied to the exhaust gas upstream of a catalyst to thereby reduce exhaust emissions and to achieve early activation of the catalyst.

Here, MBT refers to the ignition timing that makes the torque generated by the internal combustion engine maximum (that is, Minimum spark advance for Best Torque).

When the internal combustion engine is in a cold condition, for example, the temperature in the cylinder (which will be hereinafter referred to as the "in-cylinder temperature") is low. When the in-cylinder temperature is low, fuel is likely to adhere to the wall surfaces in the cylinder (e.g. the wall surface of the cylinder bore and the top surface of the piston etc). Most part of the fuel adhering to the wall surfaces in the cylinder (which fuel will be hereinafter referred to as the "adhering fuel") is not burned and discharged from the interior of the cylinder as unburned fuel. On this occasion, if a catalyst provided in the exhaust system of the internal combustion engine is not active, the aforementioned unburned fuel is emitted to the atmosphere without being removed by the catalyst.

In particular, in the case where the internal combustion engine is cold-started, it takes a long time since the start of the internal combustion engine until the exhaust gas purification apparatus becomes active, and the amount of adhering fuel becomes larger. Therefore, an unduly large quantity of unburned fuel can be emitted to the atmosphere.

The inventor of the present invention had strenuously made experiments and verifications on this to find that if the ignition timing in a spark ignition internal combustion engine is advanced to be earlier than MBT (which situation will be described as "over-advanced" hereinafter), the quantity of unburned fuel (e.g. HC) discharged from the cylinder decreases remarkably.

Furthermore, experiments and verifications made by the inventor of the present invention showed that when the ignition timing is over-advanced, while the quantity of hydrocarbons (HC) discharged from the interior of the cylinder decreases, the quantity of carbon monoxide (CO) discharged from the interior of the cylinder increases.

Carbon monoxide is, by its characteristics, oxidized in a lower temperature region as compared to hydrocarbons. Therefore, if the quantity of oxygen available in the exhaust gas is sufficient when the ignition timing is being over-advanced, carbon monoxide (CO) in the exhaust gas reacts with oxygen.

However, during and just after the start-up of the internal combustion engine, the air-fuel ratio of the air-fuel mixture is controlled to be rich in order to enhance stability of combustion of the air-fuel mixture. For this reason, the quantity of oxygen available in the air may be smaller than the quantity needed to oxidize carbon monoxide (CO). In particular when the ignition timing is being over-advanced, oxygen in the air-fuel mixture is consumed by oxidation of the aforementioned adhering fuel, and therefore the quantity of oxygen contained in the exhaust gas is considered to be smaller.

In view of the above, the control system for an internal combustion engine according to the present invention is provided with over-advance means for over-advancing the ignition timing, a catalyst disposed in an exhaust passage of the internal combustion engine, and oxygen supply means for supplying oxygen to exhaust gas upstream of the catalyst when the ignition timing is being over-advanced by the over-advance means.

By this configuration, the quantity of hydrocarbons (HC) discharged from the interior of the cylinder is decreased by the over-advance of the ignition timing, and therefore the amount of hydrocarbons (HC) discharged to the atmosphere before activation of the catalyst can be decreased.

Since carbon monoxide (CO) discharged from the interior of the cylinder reacts with oxygen supplied by the oxygen supply means, an increase in the amount of carbon monoxide (CO) emitted to the atmosphere can be prevented. Furthermore, since oxidation reaction heat is generated upon reaction of carbon monoxide (CO) and oxygen, a rise in the temperature of the catalyst can be promoted by the oxidation reaction heat.

Therefore, according to the control system for an internal combustion engine according to the present invention, it is possible to activate of a catalyst at an early time while reducing exhaust emissions emitted before the catalyst becomes active as much as possible.

In the control system for an internal combustion engine according to the present invention, the oxygen supply means may supply oxygen to the exhaust gas upstream of the catalyst by operating one or some of the cylinders of the internal combustion engine at a lean air-fuel ratio. Here, the lean air-fuel ratio refers to an air-fuel ratio at which the proportion of fuel is lower than that at the theoretical air-fuel ratio.

If one or some of the cylinders are lean-operated at a time when the internal combustion engine is in a cold condition, the stability of combustion of the air-fuel mixture can be deteriorated. In particular, if the air-fuel ratio of the air-fuel mixture is made lean in a state in which the ignition timing is being over-advanced, a failure in ignition of the air-fuel mixture can occur. In view of this, when one or some of the cylinders of the internal combustion engine are to be lean-operated, it is preferred that the ignition timing in the aforementioned one or some of the cylinders be set to be later than MBT. In this case, oxygen can be supplied without deterioration in the combustion stability in the aforementioned one or some of the cylinders.

In cases where the internal combustion engine is equipped with a secondary air supply apparatus that can supply secondary air to the exhaust passage upstream of the catalyst, the oxygen supply means may supply oxygen to the exhaust gas upstream of the catalyst by operating the secondary air supply apparatus.

The exhaust passage according to the present invention refers to a passage through which the exhaust gas discharged from the interior of the cylinders passes until discharged to the atmosphere, and is a notion that denotes, for example, the exhaust port, exhaust manifold, exhaust pipe, and muffler etc. Therefore, the secondary air supply apparatus may supply secondary air to any portion of the exhaust passage on condition that the portion is upstream of the catalyst.

In the control system for an internal combustion engine according to the present invention, the oxygen supply means may supply oxygen to the exhaust gas upstream of the catalyst by lean-operating the internal combustion engine intermittently. In this connection, it is preferred that the ignition timing during lean-operation be set to be later than MBT.

In the present invention, it is preferred that the larger the quantity of carbon monoxide (CO) contained in the exhaust gas is, the larger the quantity of oxygen supplied by the oxygen supply means be made. Therefore, the control system for an internal combustion engine according to the present invention may further include first obtaining means for obtaining the quantity of carbon monoxide (CO) discharged from the internal combustion engine. In this case, the oxygen supply means may increase the quantity of oxygen supplied, as the quantity of carbon monoxide (CO) obtained by the first obtaining means becomes larger.

For example, in cases where oxygen is supplied to the exhaust gas upstream of the catalyst by lean-operating one or some of the cylinders of the internal combustion engine, the oxygen supply means may increase the number of the cylinders that are lean-operated, or making the air-fuel ratio of the air-fuel mixture to be burned in the lean-operated cylinders higher (or leaner) thereby increasing the quantity of oxygen remaining in the exhaust gas, as the quantity of carbon monoxide (CO) obtained by the first obtaining means becomes larger.

In cases where secondary air is supplied to the exhaust gas upstream of the catalyst by the secondary air supply apparatus, the oxygen supply mean may increase the quantity of oxygen supplied by the secondary air supply apparatus per unit time, as the quantity of carbon monoxide (CO) obtained by the first obtaining means becomes larger.

In cases where oxygen is supplied to the exhaust gas upstream of the catalyst by lean-operating the internal combustion engine intermittently, the oxygen supply means may make the air-fuel ratio during the lean-operation higher (leaner), make the time duration of a single lean-operation longer, or increase the number of times of lean-operation performed per a specific time period, as the quantity of carbon monoxide (CO) obtained by the first obtaining means becomes larger.

Secondly, the control system for an internal combustion engine according to the present invention may further include second obtaining means for obtaining the temperature of the catalyst. In this configuration, when the ignition timing is being over-advanced by the over-advance means, the oxygen supply means may supply oxygen to the exhaust gas upstream of the catalyst on condition that the catalyst temperature obtained by the second obtaining means is equal to or higher than a specific temperature. To put it differently, even when the ignition timing is over-advanced by the over-advance means, the oxygen supply means may suspend the supply of oxygen if the catalyst temperature obtained by the second obtaining means is lower than the specific temperature.

The ability of a catalyst of oxidizing carbon monoxide (CO) in the exhaust gas (which ability will be hereinafter referred to as the "CO removal ability") becomes active at lower temperatures as compared to the ability of the catalyst of oxidizing hydrocarbons (HC) in the exhaust gas (which ability will be hereinafter referred to as the "HC removal ability"). However, when the temperature of the catalyst is very low, the CO removal ability is also inactive. Therefore, if the oxygen supply means supplies oxygen before the CO removal ability of the catalyst becomes active, it is difficult to remove carbon monoxide (CO) in the exhaust gas.

In view of this, it is preferred that even when the ignition timing is being over-advanced, the oxygen supply means suspend supply of oxygen if the temperature of the catalyst is lower than the specific temperature. The aforementioned specific temperature may be set to be equal to the lowest value of the temperature range in which the CO removal ability of the catalyst is active.

However, when the temperature of the exhaust gas is relatively high, carbon monoxide (CO) in the exhaust gas reacts with oxygen independently from the catalyst. Therefore, if the exhaust gas temperature is sufficiently high, the oxygen supply means may supply oxygen even when the temperature of the catalyst is lower than the specific temperature.

In the control system for an internal combustion engine according to the present invention, the oxygen supply means may suspend supply of oxygen to the exhaust gas upstream of the catalyst when the efficiency of removal of hydrocarbons (HC) (which will be hereinafter referred to as the "HC removal efficiency") is higher than the efficiency of removal of carbon monoxide (CO) (which will be hereinafter referred to as the "CO removal efficiency").

According to a finding by the inventor of the present invention, during the process of warm-up (or temperature rising process) of the catalyst, the CO removal efficiency is higher than the HC removal efficiency when the catalyst temperature is low, but the HC removal efficiency exceeds the CO removal efficiency when the catalyst temperature is raised to be equal to or higher than a particular temperature.

Therefore, after the catalyst temperature has risen to be equal to or higher than the particular temperature, hydrocarbons (HC) are removed in the catalyst even if the ignition timing is not over-advanced by the over-advance means. Furthermore, after termination of over-advance of the ignition timing, since the quantity of carbon monoxide (CO) discharged from the interior of the cylinders decreases, supply of oxygen by the oxygen supply means becomes unnecessary.

The CO removal efficiency and the HC removal efficiency of the catalyst correlate with the temperature of the catalyst. Therefore, the oxygen supply means may estimate the relative relationship between the CO removal efficiency and the HC removal efficiency based on the temperature of the catalyst. Specifically, the catalyst temperature (corresponding to the aforementioned particular temperature) at which the HC removal efficiency and the CO removal efficiency are equal to each other may be determined in advance by experiments, and supply of oxygen by the oxygen supply means may be suspended on condition that the actual catalyst temperature exceeds the aforementioned particular temperature.

THE BEST MODE FOR CARRYING OUT THE INVENTION

In the following, specific embodiments of the present invention will be described with reference to the drawings.

Embodiment 1

Figure 1:
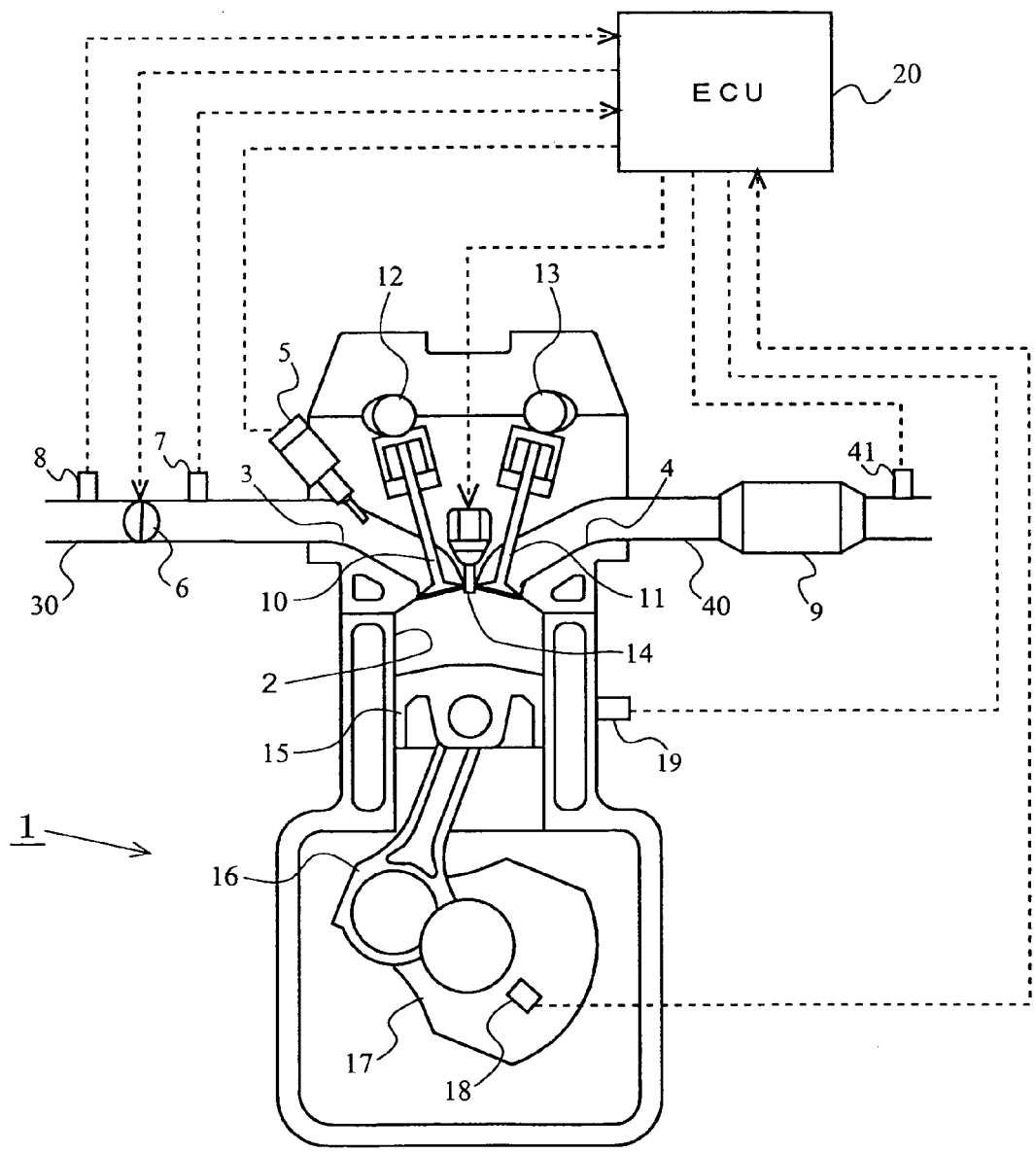
FIG. 1 is a diagram showing the general configuration of an ignition control system for an internal combustion engine according to a first embodiment.

A first embodiment of the present invention will be described with reference to FIGS. 1 to 6. FIG. 1 is a diagram showing the general configuration of an ignition control system for an internal combustion engine according to the present invention.

The internal combustion engine 1 shown in FIG. 1 is a four-stroke-cycle spark-ignition internal combustion engine (gasoline engine) having a plurality of cylinders 2. Each cylinder 2 of the internal combustion engine 1 is connected with an intake passage 30 through an intake port 3 and connected with an exhaust passage 40 via an exhaust port 4.

The intake port 3 is provided with a fuel injection valve 5 that injects fuel into the cylinder 2. The intake passage 30 is provided with a throttle valve 6 that regulates the quantity of air flowing in the intake passage 30. An intake air pressure sensor 7 that measures the pressure (intake air pressure) in the intake passage 30 is provided in the intake passage 30 downstream of the throttle valve 6. An air flow meter 8 that measures the quantity of air flowing in the intake passage 30 is provided in the intake air passage 30 upstream of the throttle valve 6.

An exhaust gas purification apparatus 9 is disposed in the exhaust passage 40. The exhaust gas purification apparatus 9 is provided with a three-way catalyst, an NOx storage reduction catalyst, or the like and purifies the exhaust gas when in a certain active temperature range. The activity of the exhaust gas purification apparatus 9, as defined herein, refers to the activity of the HC removal ability, unless otherwise specified.

An exhaust gas temperature sensor 41 that measures the temperature of the exhaust gas flowing in the exhaust passage 40 is disposed in the exhaust passage 40 downstream of the exhaust gas purification apparatus 9.

The internal combustion engine 1 is also provided with an intake valve 10 that opens and closes the open end of the intake port 3 facing the interior of the cylinder 2 and an exhaust valve 11 that opens and closes the open end of the exhaust port 4 facing the interior of the cylinder 2. The intake valve 10 and the exhaust valve 11 are driven to be opened/closed by the intake side cam shaft 12 and the exhaust side cam shaft 13 respectively.

An ignition plug 14 that ignites the air-fuel mixture in the cylinder 2 is disposed at the upper portion of the cylinder 2. A piston 15 is inserted in the cylinder 2 in a slidable manner. The piston 15 is connected with a crankshaft 17 via a connecting rod 16.

A crank position sensor 18 that senses the rotational angle of the crankshaft 17 is disposed in the vicinity of the crankshaft 17 in the internal combustion 1. Furthermore, a water temperature sensor 19 that measures the temperature of cooling water circulating in the internal combustion engine 1 is attached to the internal combustion engine 1.

To the internal combustion engine 1 having the above-described configuration is annexed an ECU 20. The ECU 20 is an electronic control unit equipped with a CPU, ROM, and RAM etc. The ECU 20 is electrically connected with the aforementioned various sensors such as the intake air pressure sensor 7, the air flow meter 8, the crank position sensor 18, the water temperature sensor 19, and the exhaust gas temperature sensor 41, and measurement values of the various sensors are input to the ECU 20.

The ECU 20 electrically controls the fuel injection valve 5, the throttle valve 6, and the ignition plug 14 based on the measurement values of the aforementioned various sensors. For example, the ECU 20 performs an adhering fuel decreasing control for decreasing the fuel adhering to the wall surface inside the cylinder 2.

In the following, the adhering fuel decreasing control according to this embodiment will be described.

When the in-cylinder temperature is low as is the case when the internal combustion engine 1 is in a cold condition, fuel is likely to adhere to the inner wall surface of the cylinder 2 and the piston 15. Most part of the fuel adhering to the inner wall surface of the cylinder 2 and the piston 15 (adhering fuel) is not burned and discharged from the interior of the cylinder as unburned fuel. On this occasion, if the temperature of the exhaust gas purification apparatus 9 has not reached the active temperature range, the aforementioned unburned fuel is emitted to the atmosphere without being removed by the exhaust gas purification apparatus 9.

In particular, when the internal combustion engine 1 is cold-started, it takes a long time since the start of the internal combustion engine 1 until the exhaust gas purification apparatus becomes active, and the amount of adhering fuel becomes larger. Therefore, an unduly large amount of unburned fuel can be emitted to the atmosphere.

As a countermeasure to this, in the adhering fuel decreasing control, when the amount of adhering fuel can be large, the ECU 20 advances the operation timing of the ignition plug 14 (i.e. the ignition timing) to a timing earlier than MBT (i.e. over-advances the timing), thereby reducing the quantity of unburned fuel (consisting mainly of hydrocarbons (HC)) discharged from the interior of the cylinder.

Figure 2:
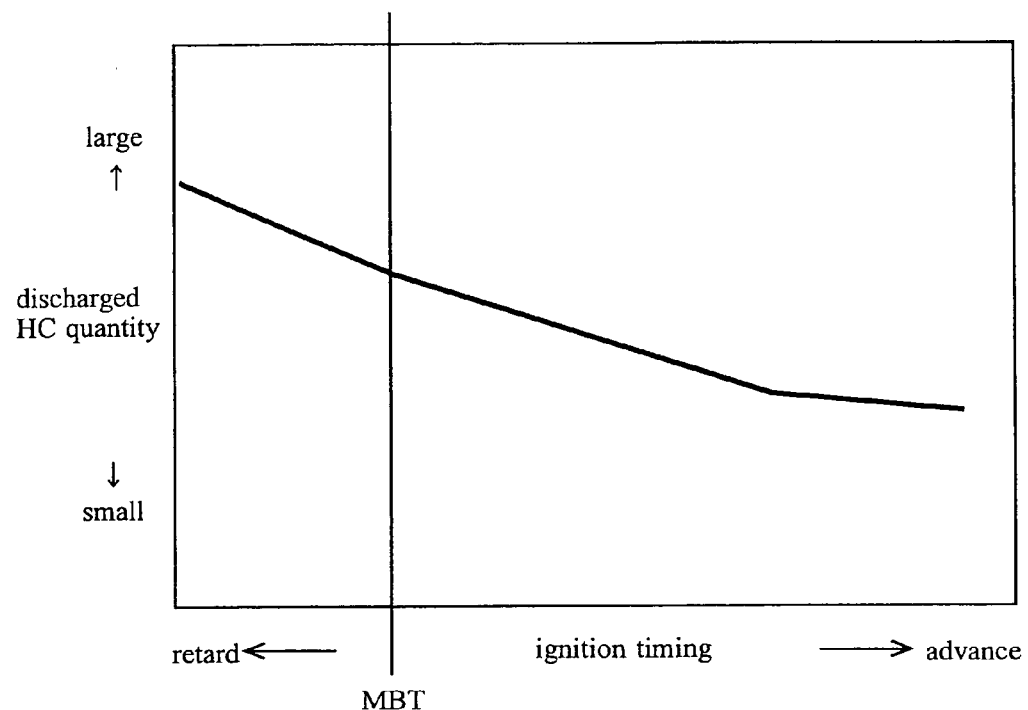
FIG. 2 is a graph showing the relationship between the quantity of hydrocarbons (HC) discharged from the interior of a cylinder and the ignition timing.

Experiments and verifications strenuously made by the inventor showed that if the ignition timing is advanced to be earlier than MBT, the quantity of hydrocarbons (HC) discharged from the interior of the cylinder 2 decreases as the degree of advancement increases, as shown in FIG. 2.

Although the mechanism of this decrease has not been elucidated, the mechanism is generally considered to be as follows.

Figure 3:
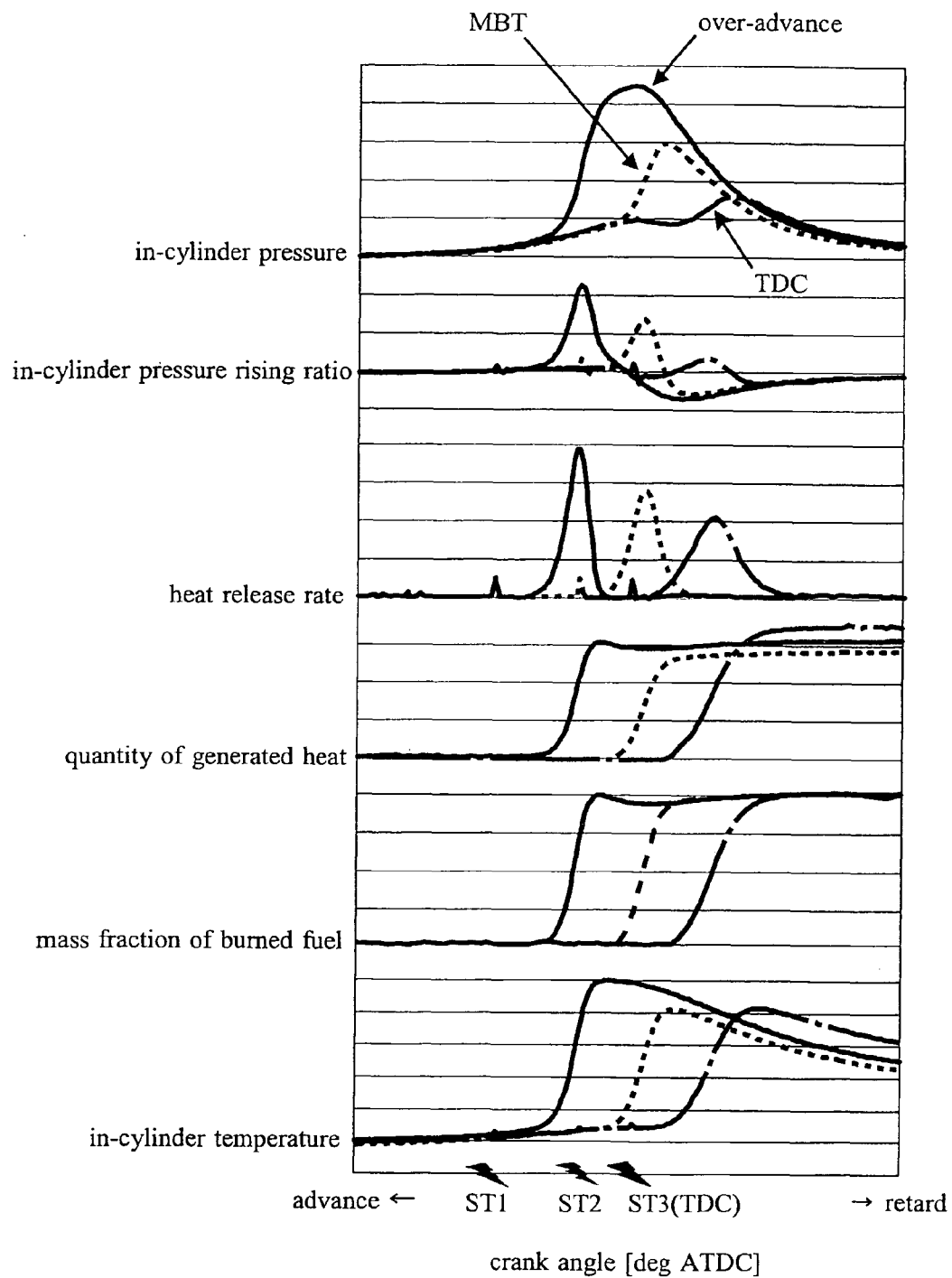
FIG. 3 is a diagram showing the relationship between the ignition timing and conditions in the interior of a cylinder.

FIG. 3 shows results of measurement of conditions in the interior of the cylinder 2 in a case where the ignition timing is over-advanced (ST1 in FIG. 3), in a case where the ignition timing is set at MBT (ST2 in FIG. 3), and in a case where the ignition timing is set at compression top dead center (TDC) (ST3 in FIG. 3) respectively.

The solid lines in FIG. 3 are for the case where the ignition timing is over-advanced, the broken lines are for the case where the ignition timing is set at MBT, and alternate long and short dashed lines are for the case where the ignition timing is set at compression top dead center (TDC).

In FIG. 3, in the case where the ignition timing is over-advanced, the quantity of air-fuel mixture burned before compression top dead center is larger than that in the case where the ignition timing is set at MBT and that in the case where the ignition timing is set at compression top dead center (TDC) Therefore, the peak position of the heat energy generated by combustion of the air-fuel mixture (see HEAT RELEASE RATE, QUANTITY OF GENERATED HEAT, and MASS FRACTION OF BURNED FUEL in FIG. 3) shifts to a time before the compression top dead center.

Therefore, by the synergetic effect of the temperature rise and pressure rise caused by combustion of the air-fuel mixture and the compression caused by upward motion of the piston (i.e. motion from the bottom dead center toward the top dead center), the peak values of the in-cylinder pressure and the in-cylinder temperature during the period from the compression stroke to the expansion stroke are increased greatly. In consequence, vaporization and oxidation of fuel adhering on the wall surface inside the cylinder and/or fuel that has not adhered to the wall surface inside the cylinder yet are promoted, we think.

In view of the above, the ECU 20 is designed to over-advance the ignition timing when the exhaust gas purification apparatus 9 is in an inactive state, and the quantity of adhering fuel is not smaller than a specific quantity.

Examples of the method of determining the quantity of adhering fuel include providing a sensor that optically measures the thickness of the liquid film in the interior of the cylinder and effecting actual measurement, providing a sensor for measuring the electrical conductivity in the interior of the cylinder and converting the measurement value of the sensor into the quantity of adhering fuel, and estimating the quantity of adhering fuel from the operation condition of the internal combustion engine 1 (which will be hereinafter referred to the "engine operation condition").

In the case where the quantity of adhering fuel is estimated from the engine operation condition, the ECU 20 may be configured to estimate the quantity of adhering fuel using as a parameter(s) at least one of the measurement value of the water temperature sensor 19 (or the cooling water temperature), the measurement value of the intake air pressure sensor 7 (or the intake air pressure), the integrated intake air quantity from the start of the internal combustion engine 1 to the present time, the integrated fuel injection quantity from the start of the internal combustion engine 1 to the present time, the fuel injection quantity at the present time, and the air-fuel ratio of the air-fuel mixture at the present time.

As an exemplary method of determining whether or not the exhaust gas purification apparatus 9 is active, a determination that the exhaust gas purification apparatus 9 is active may be made on condition that the temperature of the exhaust gas purification apparatus 9 falls within an active temperature range (or temperature purification window).

The temperature of the exhaust gas purification apparatus 9 may be estimated from the operation state of the internal combustion engine 1 (e.g. the cooling water temperature, the temperature of the exhaust gas flowing into the exhaust gas purification apparatus 9, or the temperature of the exhaust gas flowing out of the exhaust gas purification apparatus 9) and/or the operation history of the internal combustion engine 9 (e.g. the integrated intake air quantity since the start or the integrated fuel injection quantity since the start). Since the exemplary internal combustion engine 1 according to this embodiment is equipped with an exhaust gas temperature sensor 41 provided in the exhaust passage downstream of the exhaust gas purification apparatus 9, the temperature of the exhaust gas purification apparatus 9 may be estimated based on the measurement value of the exhaust gas temperature sensor 41 (i.e. based on the temperature of the exhaust gas flowing out of the exhaust gas purification apparatus 9). In this case, the exhaust gas temperature sensor 41 corresponds to the second obtaining means according to the present invention.

After the quantity of adhering fuel and the temperature of the exhaust gas purification apparatus 9 have been obtained by the above-described methods, the ECU 20 makes a determination as to whether or not the quantity of adhering fuel is equal to or larger than a specific quantity, and a determination as to whether or not the temperature of the exhaust gas purification apparatus is lower than the active temperature range. The aforementioned specific quantity may be determined so that the total amount of unburned fuel discharge from all the cylinders 2 of the internal combustion engine 1 is kept smaller than the regulation amount.

If it is determined that the quantity of adhering fuel is equal to or larger than the specific quantity and that the temperature of the exhaust gas purification apparatus 9 is lower than the active temperature range, the EUC 20 over-advances the ignition timing. This greatly decreases the quantity of hydrocarbons (HC) discharged from the interior of the cylinder 2 of the internal combustion engine 1. In consequence, the amount of hydrocarbons (HC) emitted to the atmosphere from the internal combustion engine 1 can be decreased irrespective of the purification capability of the exhaust gas purification apparatus 9.

Figure 4:
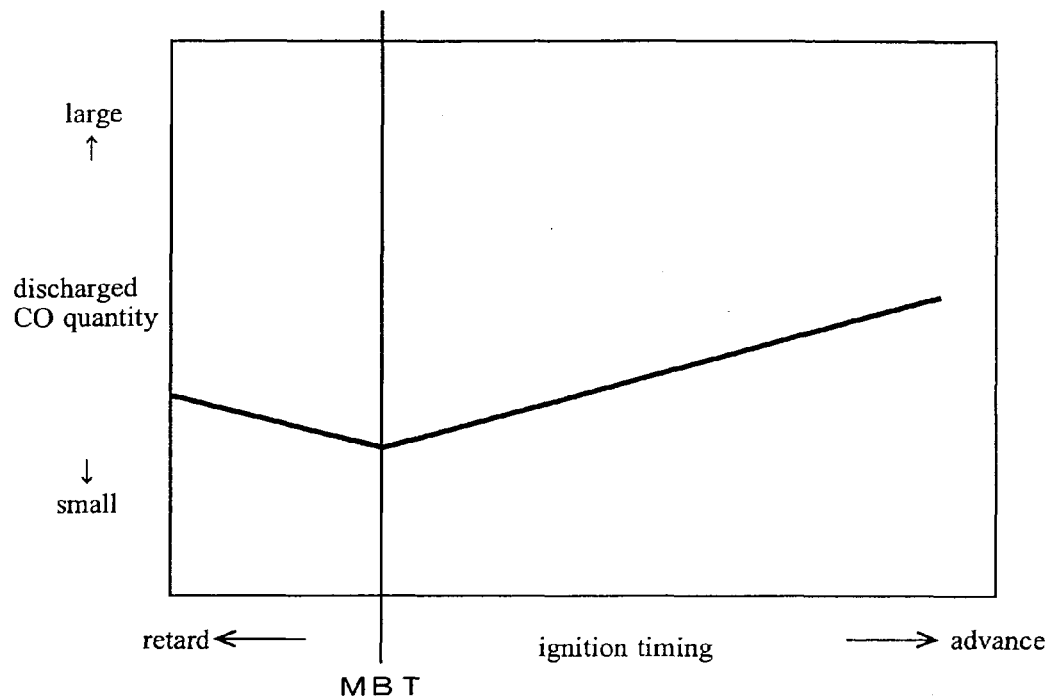
FIG. 4 is a graph showing the relationship between the quantity of carbon monoxide (CO) discharged from the interior of a cylinder and the ignition timing.

Meanwhile, experiments and verifications made by the inventor of the present invention also showed that when the ignition timing is being over-advanced, while the quantity of hydrocarbons (HC) discharged from the interior of the cylinder 2 decreases, the quantity of carbon monoxide (CO) discharged from the interior of the cylinder 2 increases as shown in FIG. 4.

In view of this, the ECU 20 is configured to perform a process of supplying oxygen to the exhaust gas upstream of the exhaust gas purification apparatus 9 (which process will be hereinafter referred to as the "oxygen supply process"), when over-advancing the ignition timing.

Carbon monoxide is, by its characteristics, oxidized at lower temperatures as compared to hydrocarbons (HC). Therefore, if the exhaust gas flowing into the exhaust gas purification apparatus 9 contains a sufficient quantity of oxygen, carbon monoxide (CO) contained in the exhaust gas is oxidized in the exhaust gas and/or in the exhaust gas purification apparatus 9.

However, in cases where the temperature of the exhaust gas is lower than the lowest temperature in the temperature range in which carbon monoxide (CO) can be oxidized (which temperature will be hereinafter referred to as the "CO oxidation start temperature"), and the temperature of the exhaust gas purification apparatus 9 is lower than the lowest temperature in the temperature range in which the CO removal ability of the exhaust gas purification apparatus 9 is active (which temperature will be hereinafter referred to as the "CO removal start temperature"), carbon monoxide (CO) in the exhaust gas is scarcely oxidized even if a sufficient quantity of oxygen is contained in the exhaust gas.

Therefore, even when the ignition timing is being over-advanced, it is preferred that execution of the oxygen supply control process be disabled, if the temperature of the exhaust gas is lower than the CO oxidation start temperature and the temperature of the exhaust gas purification apparatus 9 is lower than the CO removal start temperature.

Hence, the ECU 20 is configured to execute the oxygen supply process on condition that the measurement value of the exhaust gas temperature sensor 41 (i.e. the temperature of the exhaust gas) is equal to or higher than a specific temperature when the ignition timing is being over-advanced. The aforementioned specific temperature is equal to the CO oxidation start temperature or the CO removal start temperature, whichever is the lower.

The CO removal start temperature of the exhaust gas purification apparatus 9 is lower than the temperature range in which carbon monoxide (CO) is oxidized independently from the exhaust gas purification apparatus 9. Therefore, the aforementioned specific temperature may be set equal to the CO removal start temperature of the exhaust gas purification apparatus 9.

A specific way of implementing the oxygen supply process may be, for example, operating one or some of the cylinders 2 of the internal combustion engine 1 in lean operation. When one or some of the cylinders 2 in the internal combustion engine 1 are lean-operated, the cylinders 2 that are lean-operated (which will be hereinafter referred to as the "lean operation cylinders") emit gas having a large oxygen content. In consequence, oxygen is supplied to the exhaust gas upstream of the exhaust gas purification apparatus 9. In the following, the process of lean-operating one or some of the cylinders 2 in the internal combustion engine 1 will be referred to as the "cylinder-by-cylinder process".

If the ignition timing in the cylinder(s) that is to be lean-operated when the cylinder-by-cylinder process is executed is being over-advanced, it is possible that the ignitability and the combustion stability of the air-fuel mixture are deteriorated. In view of this, it is preferred that the ignition timing in the lean operation cylinder(s) be retarded to be later than MBT. If the ignition timing in the lean operation cylinder(s) is set to be later than MBT, deterioration in the ignitability and the combustion stability of the air-fuel mixture in the lean operation cylinder(s) is reduced.

Figure 5:
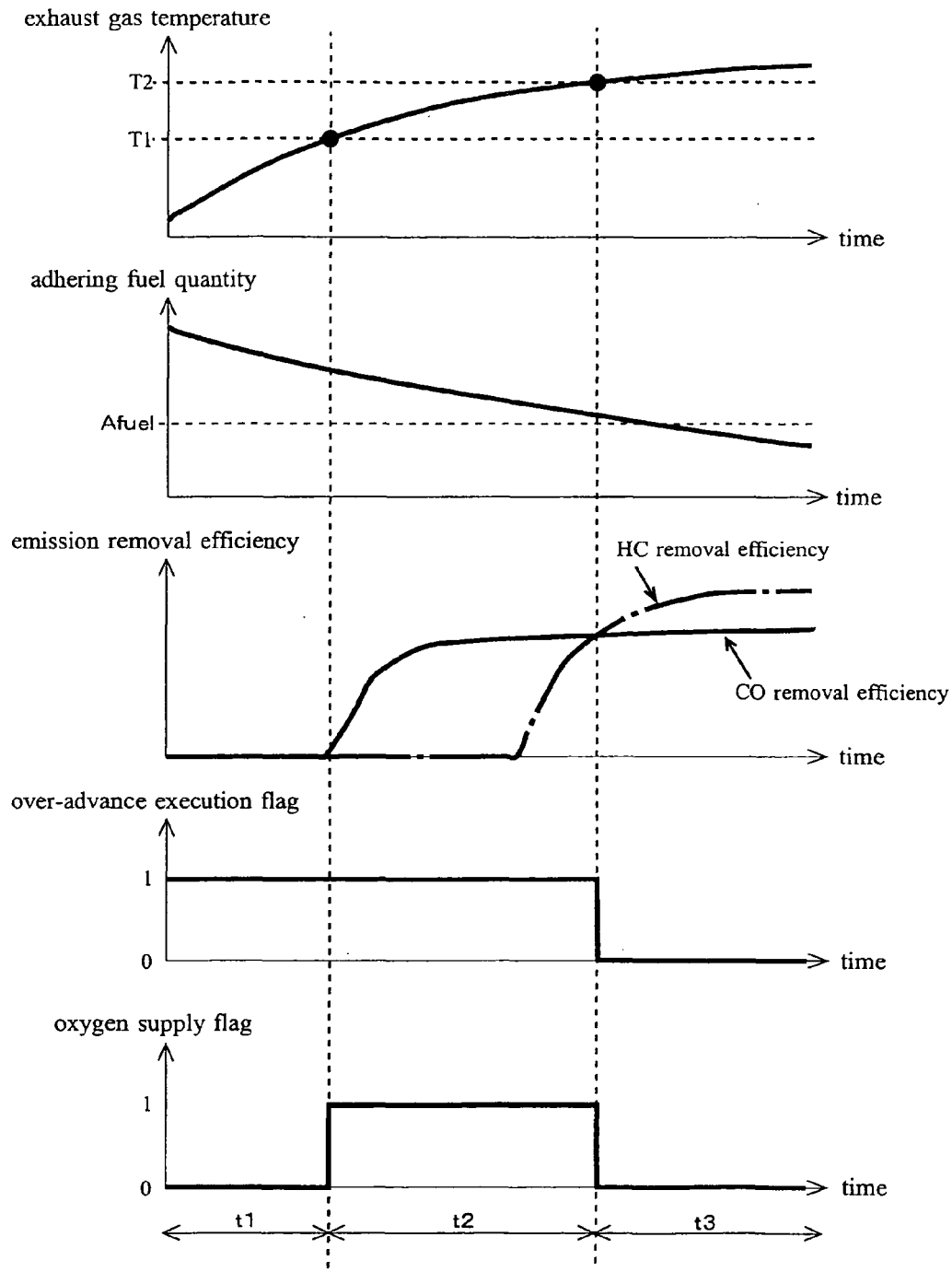
FIG. 5 is a timing chart showing a way of executing an adhering fuel decreasing control in the first embodiment.

Next, a way of executing the adhering fuel decreasing control in this embodiment will be described with reference to FIG. 5. FIG. 5 is a timing chart showing a procedure of executing the adhering fuel decreasing control.

The exhaust gas temperature referred to in FIG. 5 is the measurement value of the exhaust gas temperature sensor 41 and used as the value representing the temperature of the exhaust gas purification apparatus 9. The adhering fuel quantity indicates the quantity of adhering fuel in the case where the ignition timing is assumed not to be over-advanced. The over-advance execution flag is a flag that is set to "1" when an over-advance execution condition is satisfied, and reset to "0" when the over-advance execution condition is not satisfied. The oxygen supply flag is a flag that is set to "1" when an oxygen supply condition is satisfied, and reset to "0" when the oxygen supply condition is not satisfied.

The over-advance execution condition mentioned above is satisfied when all of the following conditions are satisfied: (1) the adhering fuel quantity is equal to or larger than a specific quantity, (2) the temperature of the exhaust gas purification apparatus 9 (or the exhaust gas temperature) is lower than a second specific temperature T2, and (3) the air-fuel ratio of the air-fuel mixture to be burned in the internal combustion engine is lower than the theoretical air-fuel ratio.

The second specific temperature T2 mentioned above corresponds to the temperature of the exhaust gas purification apparatus 9 (that is, in this case, the exhaust gas temperature) at the time when the HC removal ability of the exhaust gas purification apparatus 9 becomes active. Specifically, the second specific time T2 corresponds to the temperature of the exhaust gas purification apparatus 9 (i.e. the exhaust gas temperature) at the time when the HC removal efficiency of the exhaust gas purification apparatus 9 becomes substantially equal to the CO removal efficiency. The second specific temperature T2 is determined in advance by experiments.

The oxygen supply condition mentioned above is satisfied when the following conditions are satisfied: (1) the temperature of the exhaust gas purification apparatus 9 (i.e. the exhaust gas temperature) is equal to or higher than the first specific temperature T1, and (2) the temperature of the exhaust gas purification apparatus 9 (i.e. the exhaust gas temperature) is lower than the second specific temperature T2.

The first specific temperature T1 corresponds to the CO removal start temperature of the exhaust gas purification apparatus 9 and is determined in advance by experiments.

In FIG. 1, during the period (t1 in FIG. 5) in which the adhering fuel quantity is equal to or larger than the specific quantity A fuel and the temperature of the exhaust gas purification apparatus 9 (i.e. the exhaust gas temperature) is lower than the first specific temperature T1, the ECU 20 sets the value of the over-advance execution flag to "1", and sets the value of the oxygen supply flag to "0".

In this case, the cylinder-by-cylinder process is not executed, and only the over-advance of the ignition timing is executed. In other words, in all the cylinders 2 of the internal combustion engine 1, the ignition timing is only over-advanced, and no cylinders 2 are lean-operated. As a result, the amount of hydrocarbons (HC) discharged from all the cylinders 2 of the internal combustion engine 1 is decreased.

Secondly, during the period (t2 in FIG. 5) in which the temperature of the exhaust gas purification apparatus 9 (i.e. the exhaust gas temperature) is equal to or higher than the first specific temperature T1 and lower than the second specific temperature T2, the ECU 20 sets the value of the over-advance execution flag to "1", and sets the value of the oxygen supply flag also to "1".

In this case, the cylinder-by-cylinder process is executed, and at the same time the ignition timing is over-advanced. In other words, one or some of the cylinders 2 of the internal combustion engine 1 are lean-operated, and the ignition timing in the lean operation cylinder(s) 2 is retarded to be later than MBT. The ignition timing in the cylinders 2 that are not lean-operated (which cylinders will be hereinafter referred to as the "non-lean operation cylinders") is over-advanced.

The lean operation cylinder 2 discharges exhaust gas having a large oxygen content. The ignitability and the combustion stability of the air-fuel mixture in the lean operation cylinders 2 are supplemented by retard of the ignition timing to a timing later than MBT. An increase in the quantity of adhering fuel caused by retard of ignition timing is compensated for by making the air-fuel mixture lean. Therefore, the lean operation cylinder 2 discharges exhaust gas having a large oxygen content and a small hydrocarbon (HC) content without deterioration in the ignitability and combustion stability being caused.

The non-lean operation cylinder 2 discharges exhaust gas having a hydrocarbon (HC) content that is made small by the over-advance of ignition timing and a large carbon monoxide (CO) content. Carbon monoxide discharged from the non-lean operation cylinder(s) 2 reacts with oxygen discharged from the lean operation cylinder(s) 2 in the exhaust gas and/or in the exhaust gas purification apparatus 9. In consequence, the amount of hydrocarbons (HC) and the amount of carbon monoxide CO) emitted from the internal combustion engine 1 to the atmosphere during the aforementioned period t2 are greatly decreased. Furthermore, the temperature of the exhaust gas purification apparatus 9 rises quickly, as the exhaust gas purification apparatus 9 receives heat of oxidation reaction of carbon monoxide (CO).

Then, after the temperature of the exhaust gas purification apparatus 9 (i.e. the exhaust gas temperature) has risen to be equal to or higher than the second specific temperature T2 (t3 in FIG. 5), the ECU 20 resets the value of the over-advance execution flag to "0" and resets the value of the oxygen supply flag to "0".

In this case, all the cylinders 2 in the internal combustion engine 1 are caused to operate at a normal air-fuel ratio, and the ignition timing in all the cylinders 2 is reset to a normal ignition timing. After over-advance of the ignition timing has been terminated, the quantity of hydrocarbons (HC) contained in the exhaust gas from all the cylinders 2 may increase. However, since the HC removal efficiency of the exhaust gas purification apparatus 9 has become sufficiently high, hydrocarbons (HC) discharged from all the cylinders 2 are oxidized (or removed) in the exhaust gas purification apparatus 9. In consequence, hydrocarbons (HC) discharged from the internal combustion engine 1 are prevented from being emitted to the atmosphere without being removed.

The number of the cylinders 2 that are lean-operated when the cylinder-by-cylinder process is executed and/or the air-fuel ratio in the lean operation cylinders 2 may be either predetermined fixed values or variable values that are changed according to the quantity of carbon monoxide (CO) discharged from the non-lean operation cylinders 2.

For example, the number of the cylinders 2 that are lean-operated may be increased as the quantity of carbon monoxide (CO) discharged from the non-lean operation cylinders 2 increases, and may be decreased as the quantity of carbon monoxide (CO) discharged from the non-lean operation cylinders 2 decreases. The air-fuel ratio in the lean operation cylinders 2 may be made higher as the quantity of carbon monoxide (CO) discharged from the non-lean operation cylinders 2 increases, and may be made lower as the quantity of carbon monoxide (CO) discharged from the non-lean operation cylinders 2 decreases.

In the case where the number of the cylinders 2 that are lean-operated when the cylinder-by-cylinder process is executed and/or the air-fuel ratio in the lean operation cylinders 2 is changed according to the quantity of carbon monoxide (CO) discharged from the non-lean operation cylinders 2, carbon monoxide (CO) discharged from the non-lean operation cylinders 2 is removed neither too much nor too little. Furthermore, the number of the cylinders 2 that are lean-operated is prevented from being made unnecessarily large, and the air-fuel ratio in the lean operation cylinders 2 is prevented from being made unnecessarily high. Therefore, the combustion condition in the internal combustion engine 1 can be stabilized as much as possible.

A CO concentration sensor may be provided upstream of the exhaust gas purification apparatus 9 to sense the quantity of carbon monoxide (CO) discharged from the non-lean operation cylinders 2. In this case, the CO concentration sensor corresponds to the first obtaining means according to the present invention. Alternatively, the quantity of carbon monoxide (CO) discharged from the non-lean operation cylinders 2 may be estimated by the ECU 20 based on an operation condition (at least one of the fuel injection quantity, intake air quantity, ignition timing, air-fuel ratio, cooling water temperature, intake air temperature, and ambient air temperature) of the internal combustion engine 1. In this case, the ECU 20 corresponds to the first obtaining means according to the present invention.

Figure 6:
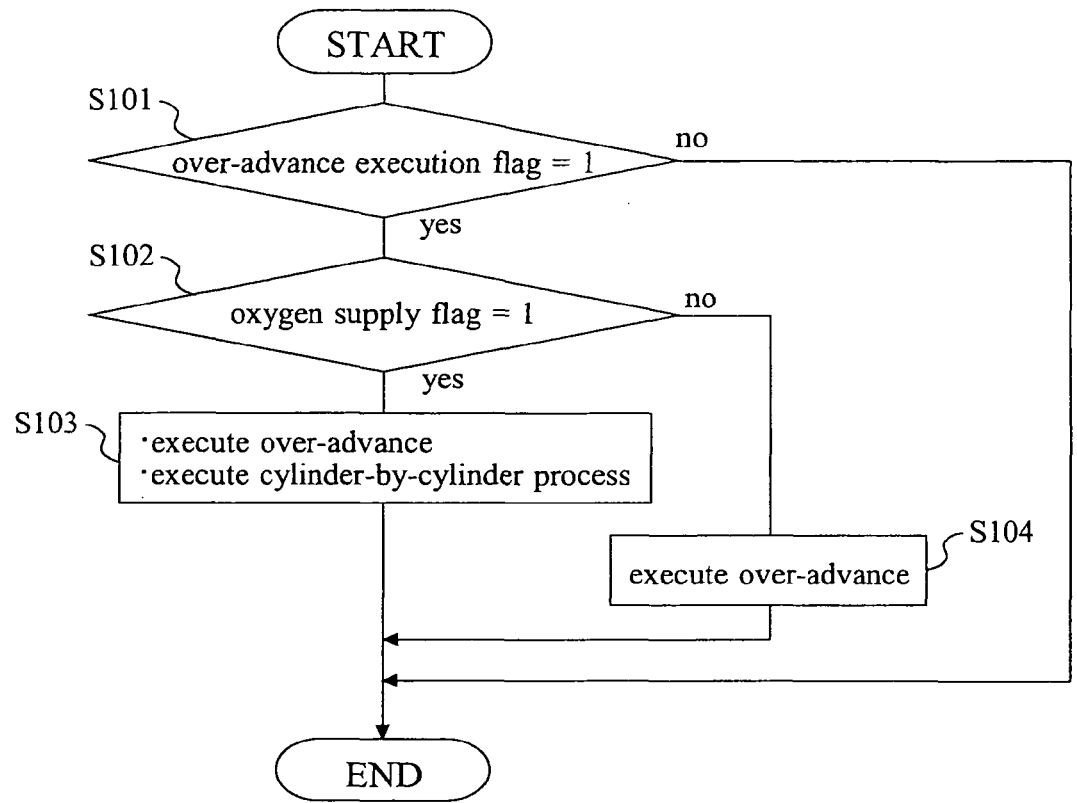
FIG. 6 is a flow chart of an adhering fuel decreasing control routine in the first embodiment.

A procedure of execution of the adhering fuel decreasing control in this embodiment will be described with reference to a flow chart of FIG. 6. FIG. 6 is a flow chart showing an adhering fuel decreasing control routine. The adhering fuel decreasing control routine is a routine that is executed periodically by the ECU 20 and stored in advance in a ROM of the ECU 20.

In the adhering fuel decreasing routine, first in step S101, the ECU 20 determines whether or not the value of the over-advance execution flag is "1". In other words, the ECU 20 determines whether or not the over-advance execution condition mentioned in the above description of FIG. 5 is satisfied.

If the determination in the above step S101 is negative (i.e. over-advance execution flag≠1), the ECU 20 once terminates execution of this routine. On the other hand, if the determination in the above step S101 is affirmative (i.e. the over-advance execution flag=1), the ECU 20 proceeds to step S102.

In step S102, the ECU 20 determines whether or not the value of the oxygen supply flag is "1". In other words, the ECU 20 determines whether or not the oxygen supply condition mentioned in the above description of FIG. 5 is satisfied.

If the determination in the above step S102 is affirmative (i.e. the oxygen supply flag=1), the ECU 20 proceeds to step S103. In step S103, the ECU 20 executes over-advance of ignition timing and the cylinder-by-cylinder process (see period t2 in FIG. 5 described before). Specifically, the ECU 20 sets the air-fuel ratio of the air-fuel mixture to a lean air-fuel ratio and retards the ignition timing to a timing later than MBT in one or some of the cylinders 2. The ECU 20 over-advances the ignition timing in the non-lean operation cylinders 2. The number of the cylinders 2 that are lean-operated and/or the air-fuel ratio in the lean operation cylinders 2 may be changed according to the quantity of carbon monoxide (CO) discharged from the non-lean combustion cylinders 2.

When the process of the above step S103 is executed, the lean operation cylinders 2 discharge exhaust gas having a large oxygen content and a small hydrocarbon (HC) content without deterioration in the ignitability and combustion stability of the air-fuel mixture being caused. The non-lean operation cylinders 2 discharge exhaust gas having a small hydrocarbon (HC) content and a large carbon monoxide (CO) content.

Carbon monoxide discharged from the non-lean operation cylinders 2 reacts with oxygen discharged from the lean operation cylinders 2 in the exhaust gas and/or in the exhaust gas purification apparatus 9. Heat generated in oxidation of carbon monoxide (CO) is transferred to the exhaust gas purification apparatus 9.

In consequence, the quantity of hydrocarbons (HC) and carbon monoxide (CO) emitted from the internal combustion engine 1 to the atmosphere can be decreased without making the operation state of the internal combustion engine 1 unstable, and the early activation of the exhaust gas purification apparatus 9 can be achieved.

On the other hand, if the determination in the aforementioned step S102 is negative (i.e. the oxygen supply flag≠1), the ECU 20 proceeds to step S104. In step S104, the ECU 20 only executes over-advance of ignition timing without executing the cylinder-by-cylinder process (see period t1 in FIG. 5 described before).

In this case, the ignition timing is over-advanced in all the cylinders 2 in the internal combustion engine 1. The over-advance of ignition timing leads to a decrease in the amount of hydrocarbons (HC) discharged from all the cylinders 2 in the internal combustion engine 1. In consequence, the amount of hydrocarbons (HC) emitted to the atmosphere from the internal combustion engine 1 is decreased.

As described above, by execution of the adhering fuel decreasing control routine in FIG. 6 by the ECU 20, the over-advance means and the oxygen supply means according to the present invention are realized. Therefore, in the spark ignition internal combustion engine 1, exhaust emissions emitted before activation of the exhaust gas purification apparatus 9 can be decreased as much as possible, and early activation of the exhaust gas purification apparatus 9 can be achieved.

Embodiment 2

Next, a second embodiment of the control system for an internal combustion engine according to the present invention will be described with reference to FIGS. 7 to 9. Here, features that are different from those in the above-described first embodiment will be described, and description of like features will be omitted.

In this embodiment, a description will be made of a case in which oxygen is supplied to the exhaust gas upstream of the exhaust gas purification apparatus 9 by lean-operating all the cylinders 2 in the internal combustion engine 1 intermittently when the oxygen supply condition is satisfied.

Figure 7:
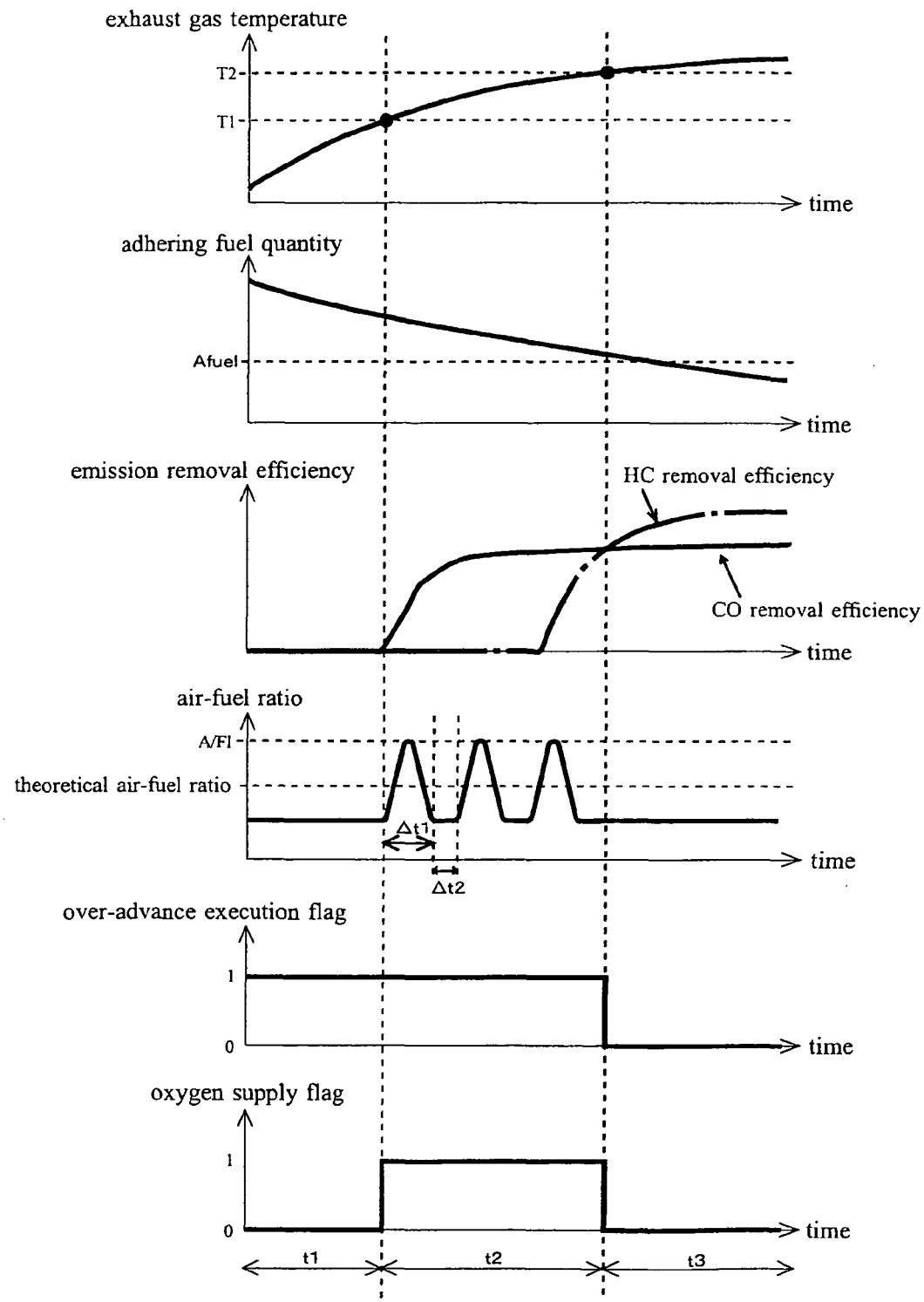
FIG. 7 is a timing chart showing a way of executing an adhering fuel decreasing control in a second embodiment.
Figure 8:
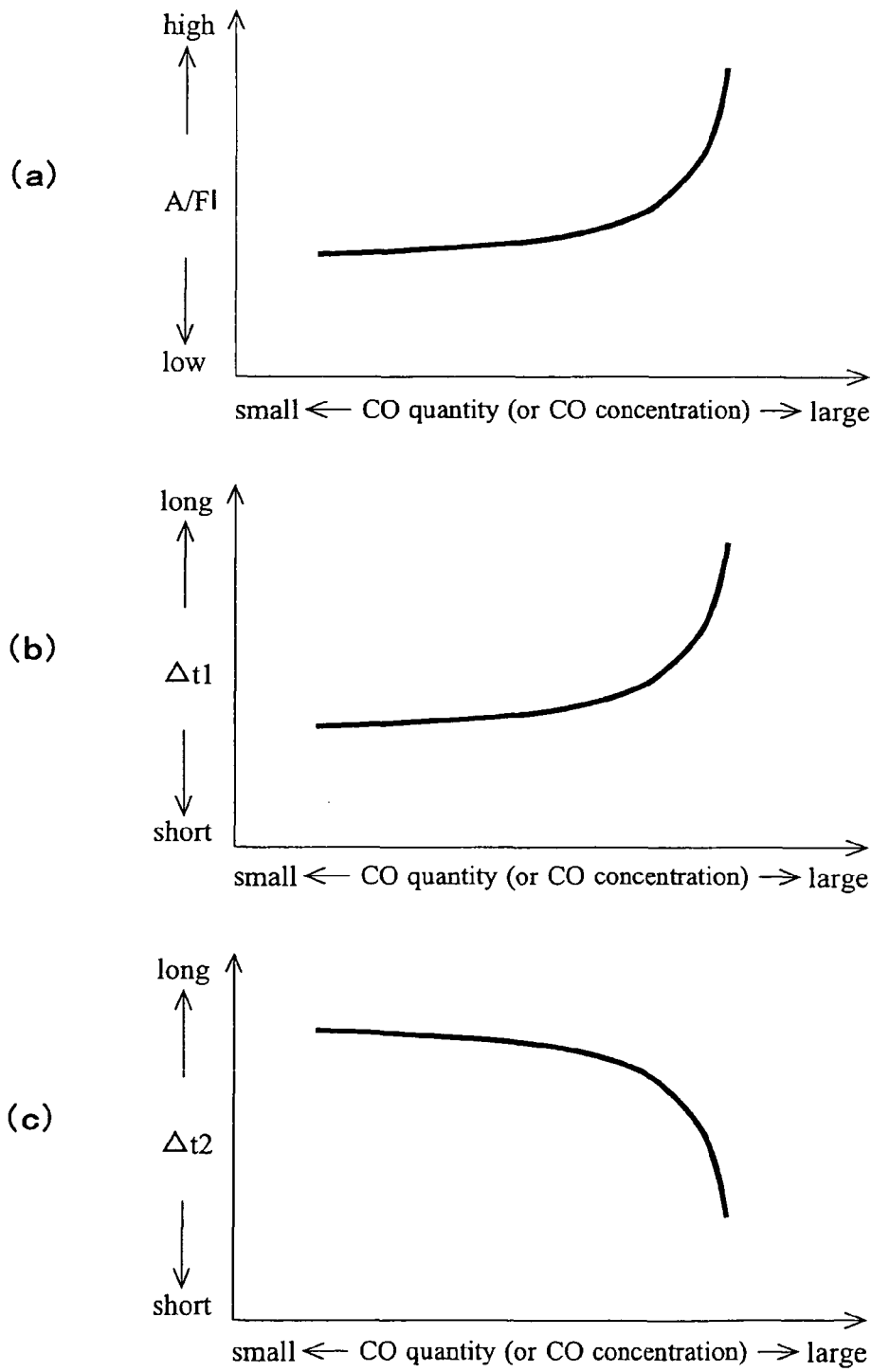
FIG. 8(a) is a graph showing the relationship between the air-fuel ratio during lean-operation and the quantity of CO.
FIG. 8(b) is a graph showing the relationship between the duration of a single lean operation and the quantity of CO.
FIG. 8(c) is a graph showing the relationship between the interval of lean operations and the quantity of CO.

FIG. 7 is a timing chart showing a way of executing the adhering fuel decreasing control according to this embodiment. The air-fuel ratio shown in FIG. 7 refers to the air-fuel ratio of the air-fuel mixture to be burned in all the cylinders 2 in the internal combustion engine 1.

In FIG. 7, during the period in which the oxygen supply condition is satisfied (t2 in FIG. 7), the ECU 20 causes the internal combustion engine 1 to lean-operate intermittently. In this case, the air-fuel ratio in combustion in all the cylinders 2 of the internal combustion engine 1 becomes lean intermittently. When the internal combustion engine 1 is lean-operated, the exhaust gas discharged from the internal combustion engine is a gas that contains a large quantity of oxygen. Consequently, oxygen is intermittently supplied to the exhaust gas upstream of the exhaust gas purification apparatus 9. It is preferred that the ignition timing during the time in which the internal combustion engine 1 is lean-operated be retarded to a timing later than MBT.

Thus, carbon monoxide (CO) discharged from the internal combustion engine 1 during the periods in which the internal combustion engine 1 is not lean-operated (that is, in the case of FIG. 7, during the periods in which the internal combustion engine is rich-operated) reacts with oxygen discharged from the internal combustion engine 1 during the periods in which the internal combustion engine 1 is lean-operated in the exhaust gas and/or in the exhaust gas purification apparatus 9.

Since the lean operation periods and the rich operation periods are different, there may be a case where carbon monoxide (CO) discharged from the internal combustion engine 1 during the rich operation periods is not oxidized fully. In view of this, it is preferred that the exhaust gas purification apparatus 9 have the ability of storing oxygen contained in the exhaust gas when exposed to a lean exhaust gas atmosphere and releasing oxygen stored therein when exposed to a rich exhaust gas atmosphere (i.e. what is called oxygen storing ability).

If the exhaust gas purification apparatus 9 has the oxygen storing ability, it stores oxygen during the period in which the internal combustion engine 1 is lean-operated and releases oxygen stored therein during the period in which the internal combustion engine 1 is rich-operated. In consequence, carbon monoxide (CO) discharged from the internal combustion engine 1 in rich operation can be substantially fully oxidized.

The air-fuel ratio A/F1 during the period in which the internal combustion engine 1 is lean-operated, the time duration Δt1 of a single lean operation, and the number of times of lean operation per unit time (in other words, the interval Δt2 between lean operations) may be changed according to the quantity of carbon monoxide (CO) discharged from the internal combustion engine 1 during the rich operation period.

For example, the air-fuel ratio A/F1 during the lean operation period may be made higher as the quantity of carbon monoxide (CO) discharged from the internal combustion engine 1 (or the CO concentration in the exhaust gas) during the rich operation period increases, and it may be made lower as the quantity of carbon monoxide (CO) discharged from the internal combustion engine 1 (or the CO concentration in the exhaust gas) during the rich operation period decreases, as shown in FIG. 8(a).

The time duration Δt1 of a single lean operation may be made longer as the quantity of carbon monoxide (CO) discharged from the internal combustion engine 1 (or the CO concentration in the exhaust gas) during the rich operation period increases, and it may be made shorter as the quantity of carbon monoxide (CO) discharged from the internal combustion engine 1 (or the CO concentration in the exhaust gas) during the rich operation period decreases, as shown in FIG. 8(b).

The interval Δt2 between lean operations may be made shorter as the quantity of carbon monoxide (CO) discharged from the internal combustion engine 1 (or the CO concentration in the exhaust gas) during the rich operation period increases, and it may be made longer as the quantity of carbon monoxide (CO) discharged from the internal combustion engine 1 (or the CO concentration in the exhaust gas) during the rich operation period decreases, as shown in FIG. 8(c). In this case, the number of times of lean operation per unit time increases with an increase in the quantity of carbon monoxide (CO) discharged from the internal combustion engine 1 (or the CO concentration in the exhaust gas) during the rich operation period, and it decreases with a decrease in the quantity of carbon monoxide (CO) discharged from the internal combustion engine 1 (or the CO concentration in the exhaust gas) during the rich operation period.

If the air-fuel ratio A/F1 during the period of lean-operation, the time duration Δt1 of a single lean operation, or the interval Δt2 between lean operations is determined in the manner shown in FIGS. 8(a) to 8(c), carbon monoxide (CO) discharged from the internal combustion engine 1 during the period of rich operation will be removed neither too much nor too little. In addition, since the air-fuel ratio A/F1 during the period of lean-operation, the time duration Δt1 of a single lean operation, and the number of times of lean operation per unit time are not increased unnecessarily, the combustion condition in the internal combustion engine 1 can be made as stable as possible.

Next, a procedure of execution of the adhering fuel decreasing control in this embodiment will be described with reference to a flow chart of FIG. 9. FIG. 9 is a flow chart showing an adhering fuel decreasing control routine. The adhering fuel decreasing control routine is a routine that is executed periodically by the ECU 20 and stored in advance in a ROM of the ECU 20. In FIG. 9, the processes same as those in the adhering fuel decreasing control routine according to the above-described first embodiment (see FIG. 6) are denoted by the same signs.

Figure 9:
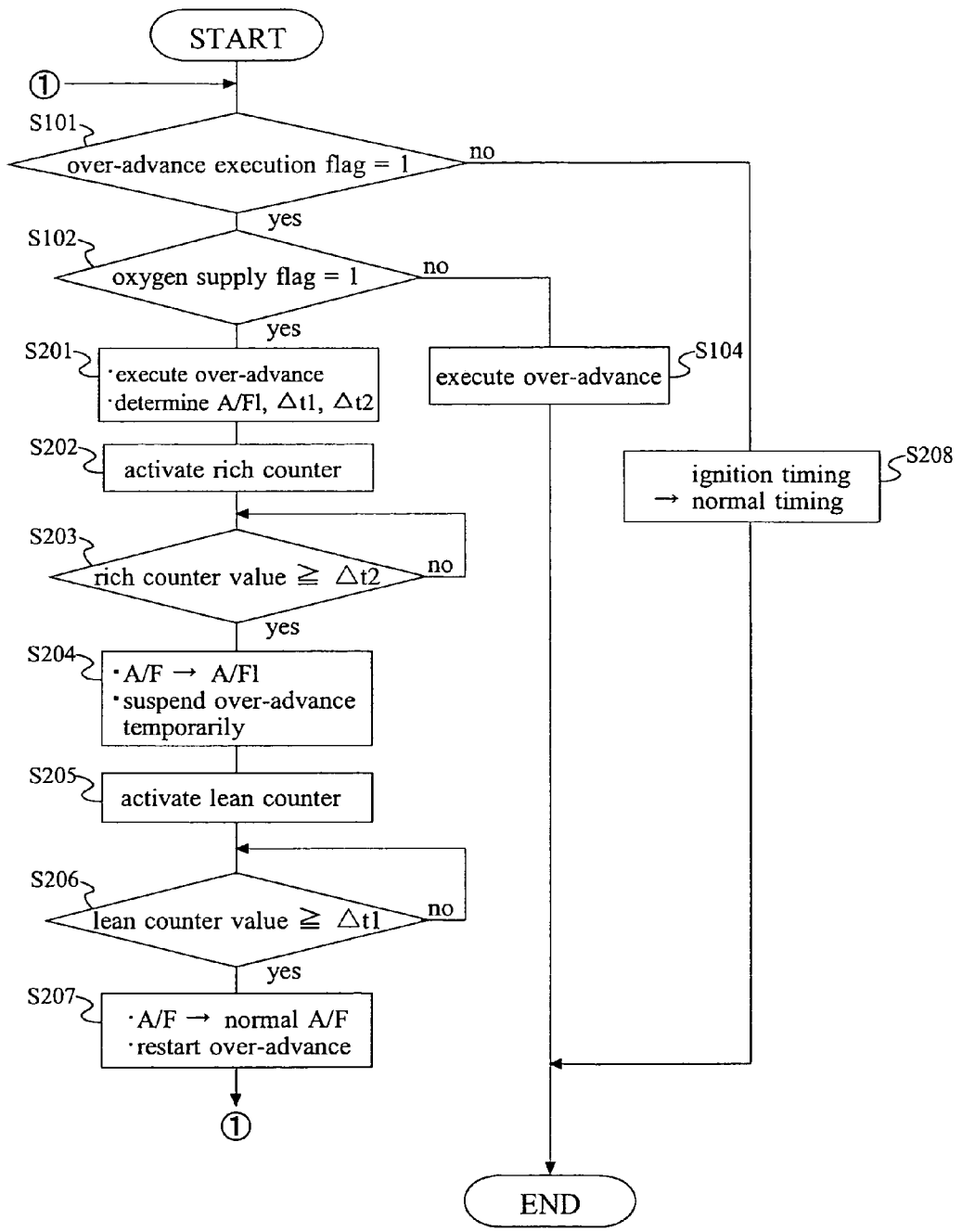
FIG. 9 is a flow chart of an adhering fuel decreasing control routine in the second embodiment.

In the adhering fuel decreasing routine shown in FIG. 9, if the determination in step S102 is affirmative (i.e. the oxygen supply flag=1), the ECU 20 proceeds to step S201. In step S201, the ECU 20 over-advances the ignition timing in all the cylinders 2. Furthermore, the ECU 20 determines the air-fuel ratio A/F1 during the period of lean-operation, the time duration Δt1 of a single lean operation, and the interval Δt2 of lean operations. At least one of the air-fuel ratio A/F1 during the period of lean-operation, the time duration Δt1 of a single lean operation, and the interval Δt2 of lean operations may be determined based on the maps shown in FIG. 8.

In step S202, the ECU 20 activates a rich counter. The rich counter is a counter that measures the time over which the internal combustion engine 1 is rich-operated.

In step S203, the ECU 20 determines whether or not the value of the rich counter is equal to or larger than the aforementioned interval Δt2. If the determination in step S203 is negative (i.e. the rich counter value <Δt2), the ECU 20 executes the process of S203 repeatedly until the value of the rich counter becomes equal to or larger than the aforementioned interval Δt2. If the determination in step S203 is affirmative (i.e. the rich counter value ≧Δt2), the ECU 20 proceeds to step S204.

In step S204, the ECU 20 changes the air-fuel ratio to the air-fuel ratio A/F1 determined in the above-described step S201, in all the cylinders 2 of the internal combustion engine 1, and retards the ignition timing to a timing later than MBT.

In step S205, the ECU 20 activates a lean counter. The lean counter is a counter that measures the time over which the internal combustion engine 1 is lean-operated.

In step S206, the ECU 20 determines whether or not the value of the lean counter is equal to or larger than the lean operation time Δt1 determined in the above-described step S201. If the determination in step S206 is negative (i.e. the lean counter value <Δt1), the ECU 20 executes the process of S206 repeatedly until the value of the lean counter becomes equal to or larger than, the aforementioned lean operation time Δt1. If the determination in step S206 is affirmative (i.e. the lean counter value ≧Δt1), the ECU 20 proceeds to step S207.

In step S207, the ECU 20 changes the air-fuel ratio in all the cylinders 2 back to a normal air-fuel ratio, and restarts over-advance of ignition timing. Then, the ECU 20 returns to step S101, where it determines whether or not the value of the over-advance execution flag is "1". If the determination in step S101 is affirmative (i.e. the over-advance execution flag=1), the ECU 20 executes the process of step S102 and the succeeding steps. If the determination in step S101 is negative (i.e. the over-advance execution flag≠1), the ECU 20 changes the ignition timing back to a normal timing, in step S208.

As described in the foregoing, in the case where the ECU 20 executes the adhering fuel decreasing routine shown in FIG. 9, the internal combustion engine 1 is lean-operated intermittently when the over-advance execution condition and the oxygen supply condition are satisfied. In consequence, the amount of hydrocarbons (HC) and carbon monoxide (CO) emitted to the atmosphere from the internal combustion engine 1 can be decreased, and early activation of the exhaust gas purification apparatus 9 can be achieved.

Therefore, according to the control system for an internal combustion engine 1 of this embodiment, in the spark ignition internal combustion engine 1, exhaust emissions emitted before activation of the exhaust gas purification apparatus 9 can be decreased as much as possible, and early activation of the exhaust gas purification apparatus 9 can be achieved.

Embodiment 3

Next, a third embodiment of the control system for an internal combustion engine according to the present invention will be described with reference to FIGS. 10 and 11. Here, features that are different from those in the above-described first embodiment will be described, and description of like features will be omitted.

In this embodiment, a description will be made of a case in which oxygen is supplied to the exhaust gas upstream of the exhaust gas purification apparatus 9 by use of a secondary air supply apparatus when the oxygen supply condition is satisfied.

Figure 10:
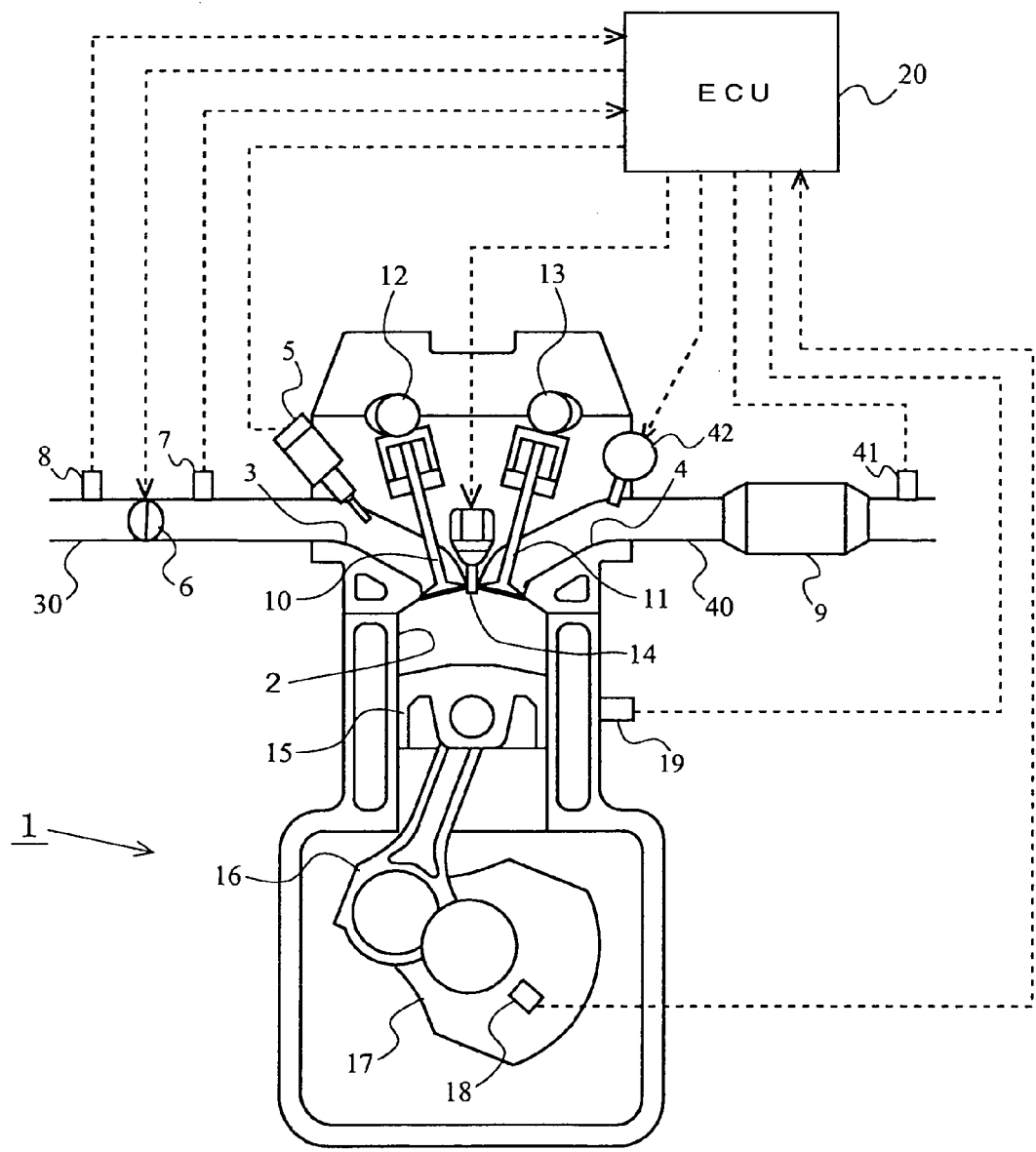
FIG. 10 is a diagram showing the general configuration of a control system for an internal combustion engine according to a third embodiment.

FIG. 10 is a diagram showing the general configuration of a control system for an internal combustion engine according to this embodiment. The internal combustion engine 1 shown in FIG. 10 is equipped with a secondary air supply apparatus 42 that injects air (i.e. secondary air) into the exhaust port 4. The configuration other than this is the same as that of the above-described first embodiment.

In the following, a procedure of execution of the adhering fuel decreasing control in this embodiment will be described with reference to a flow chart of FIG. 11. FIG. 11 is a flow chart showing an adhering fuel decreasing control routine. The adhering fuel decreasing control routine is a routine that is executed periodically by the ECU 20 and stored in advance in a ROM of the ECU 20. In FIG. 11, the processes same as those in the adhering fuel decreasing control routine according to the above-described first embodiment (see FIG. 6) are denoted by the same signs.

Figure 11:
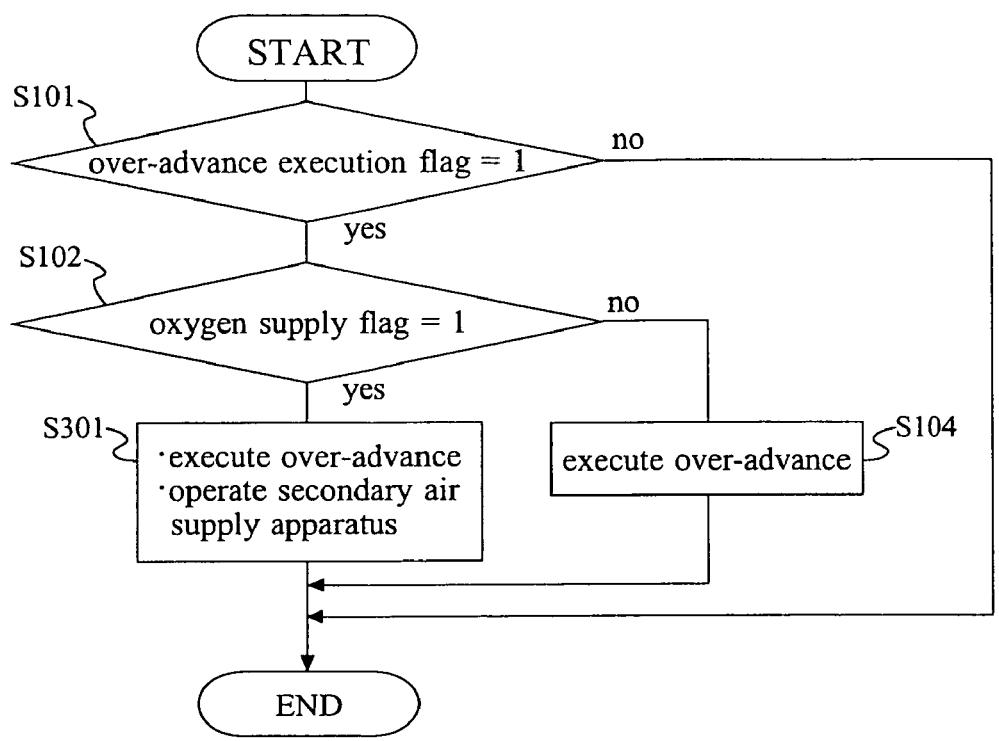
FIG. 11 is a flow chart of an adhering fuel decreasing control routine in the third embodiment.

In the adhering fuel decreasing routine shown in FIG. 11, if the determination in step S102 is affirmative (i.e. the oxygen supply flag=1), the ECU 20 proceeds to step S301. In step S301, the ECU 20 over-advances the ignition timing in all the cylinders 2 of the internal combustion engine 1 and activates the secondary air supply apparatus 42.

In this case, the exhaust gas discharged from all the cylinders 2 of the internal combustion engine 1 is a gas having a small hydrocarbon (HC) content and a large carbon monoxide (CO) content. When secondary air is supplied to such an exhaust gas from the secondary air supply apparatus 42, carbon monoxide (CO) in the exhaust gas and oxygen in the secondary air react in the exhaust gas and/or in the exhaust gas purification apparatus 9. In consequence, carbon monoxide (CO) discharged from the internal combustion engine 1 is prevented from being emitted to the atmosphere without being removed. Furthermore, the heat of reaction of carbon monoxide (CO) and the oxygen promotes a rise in the temperature of the exhaust gas purification apparatus 9.

Therefore, according to the control system for an internal combustion engine according to this embodiment, in the spark ignition internal combustion engine 1, exhaust emissions emitted before activation of the exhaust gas purification apparatus 9 can be decreased as much as possible, and early activation of the exhaust gas purification apparatus 9 can be achieved. Furthermore, according to the control system for an internal combustion engine of this embodiment, carbon monoxide (CO) can be removed without lean-operating some or all of the cylinders 2 of the internal combustion engine 1. Therefore, combustion stability in the internal combustion engine 1 is not deteriorated.

The quantity of secondary air supplied by the secondary air supply apparatus 42 during execution of the adhering fuel deceasing control may be either fixed, or changed according to the quantity of carbon monoxide (CO) discharged from the internal combustion engine 1.

The way of operating the secondary air supply apparatus 42 may be either operating the secondary air supply apparatus 42 continuously, or operating the secondary air supply apparatus 42 intermittently.

In the case where the secondary air supply apparatus 42 is operated continuously, the ECU 20 may increase the quantity of secondary air injected per unit time by the secondary air supply apparatus 42 as the quantity of carbon monoxide (CO) discharged from the internal combustion engine 1 increases, and the ECU 20 may decrease the quantity of secondary air as the quantity of carbon monoxide (CO) discharged from the internal combustion engine 1 decreases.

In the case where the secondary air supply apparatus 42 is operated intermittently, the ECU 20 may increase the quantity of secondary air injected by the secondary air supply apparatus 42 per unit time or the operation time of one injection as the quantity of carbon monoxide (CO) discharged from the internal combustion engine 1 increases. The ECM 20 may decrease the interval of operations of the secondary air supply apparatus 42 as the quantity of carbon monoxide (CO) discharged from the internal combustion engine 1 increases.

In the case where the quantity of secondary air supplied is changed according to the quantity of carbon monoxide (CO) discharged from the internal combustion engine 1, carbon monoxide (CO) discharged from the internal combustion engine 1 is removed neither too much nor too little. Furthermore, since the quantity of secondary air supplied does not become too much, a rise in the temperature of the exhaust gas purification apparatus 9 is not prevented by the secondary air.

Although the secondary air supply apparatus 42 according to this embodiment is adapted to supply secondary air into the exhaust port 4 of the internal combustion engine 1, secondary air may be supplied at any position upstream of the exhaust gas purification apparatus 9.

However, the higher the temperature of the exhaust gas at the time when secondary air is supplied is, the larger the quantity of carbon monoxide (CO) oxidized in the exhaust gas (i.e. the quantity of carbon monoxide (CO) oxidized before reaching the exhaust gas purification apparatus 9) is.

Therefore, it can be said that it is preferred that the position at which secondary air is supplied by the secondary air supply apparatus 42 be made as close to the combustion chamber as possible.

The invention claimed is:

1. A control system for an internal combustion engine comprising:
    over-advance unit for advancing the ignition timing of a spark ignition internal combustion engine to a timing earlier than MBT;
    a catalyst provided in an exhaust passage of said internal combustion engine; and
    oxygen supply unit for supplying oxygen to exhaust gas upstream of the catalyst by lean-operating one or more of cylinders of said internal combustion engine, when the ignition timing in one or more rich cylinders is advanced to a timing earlier than MBT by the over-advance unit,
    wherein the ignition timing in the lean-operated cylinder is set to be later than MBT.

2. A control system for an internal combustion engine comprising:
    over-advance unit for advancing the ignition timing of a spark ignition internal combustion engine to a timing earlier than MBT;
    a catalyst provided in an exhaust passage of said internal combustion engine; and
    oxygen supply unit for supplying oxygen to exhaust gas upstream of the catalyst by lean-operating said internal combustion engine intermittently, when the ignition timing in one or more rich cylinders is advanced to a timing earlier than MBT by the over-advance unit,
    wherein when said internal combustion engine is lean-operated, the ignition timing is set to be later than MBT.

3. A control system for an internal combustion engine according to claim 1, further comprising first obtaining unit for obtaining the quantity of carbon monoxide (CO) discharged from said internal combustion engine, wherein said oxygen supply unit increases the quantity of oxygen supplied to exhaust gas upstream of said catalyst as the quantity of carbon monoxide (CO) obtained by said first obtaining unit becomes larger.

4. A control system for an internal combustion engine according to claim 1, further comprising second obtaining unit for obtaining the temperature of said catalyst, wherein when the ignition timing is advanced to be earlier than MBT by said over-advance unit, said oxygen supply unit suspends supply of oxygen to exhaust gas upstream of said catalyst if the catalyst temperature obtained by said second obtaining unit is lower than a specific temperature.

5. A control system for an internal combustion engine according to claim 4, wherein said specific temperature is the lowest value of a temperature range in which said catalyst can oxidize carbon monoxide (CO) in exhaust gas.

6. A control system for an internal combustion engine according to claim 1, wherein when the hydrocarbon (HC) removal efficiency in said catalyst is higher than the carbon monoxide (CO) removal efficiency in said catalyst, said oxygen supply unit suspends supply of oxygen to exhaust gas upstream of said catalyst.

7. A control system for an internal combustion engine according to claim 2, further comprising first obtaining unit for obtaining the quantity of carbon monoxide (CO) discharged from said internal combustion engine, wherein said oxygen supply unit increases the quantity of oxygen supplied to exhaust gas upstream of said catalyst as the quantity of carbon monoxide (CO) obtained by said first obtaining unit becomes larger.

8. A control system for an internal combustion engine according to claim 2, further comprising second obtaining unit for obtaining the temperature of said catalyst, wherein when the ignition timing is advanced to be earlier than MBT by said over-advance unit, said oxygen supply unit suspends supply of oxygen to exhaust gas upstream of said catalyst if the catalyst temperature obtained by said second obtaining unit is lower than a specific temperature.

9. A control system for an internal combustion engine according to claim 8, wherein said specific temperature is the lowest value of a temperature range in which said catalyst can oxidize carbon monoxide (CO) in exhaust gas.

10. A control system for an internal combustion engine according to claim 2, wherein when the hydrocarbon (HC) removal efficiency in said catalyst is higher than the carbon monoxide (CO) removal efficiency in said catalyst, said oxygen supply unit suspends supply of oxygen to exhaust gas upstream of said catalyst.

* * * * *